United States Patent [19]

Shah

[11] 4,220,342
[45] Sep. 2, 1980

[54] GASKET HAVING POLYSILOXANE SEALANT LAYER CONTAINING ORGANOTITANATE

[75] Inventor: Kanu G. Shah, Arlington Heights, Ill.

[73] Assignee: Dana Corporation, Toledo, Ohio

[21] Appl. No.: 43,049

[22] Filed: May 29, 1979

[51] Int. Cl.³ .............................................. F16J 15/12
[52] U.S. Cl. .................................... 277/228; 277/230; 277/234; 277/235 A; 156/329
[58] Field of Search ................... 277/96.2, 165, 166, 277/228, 227, 230, 233, 234, 235 A, DIG. 6; 156/308, 326, 327, 329

[56] References Cited

U.S. PATENT DOCUMENTS

| | | | |
|---|---|---|---|
| 2,512,058 | 6/1950 | Gulledge et al. | 260/46.5 |
| 2,716,656 | 8/1955 | Boyd | 260/429 |
| 2,751,314 | 6/1956 | Keil | 117/72 |
| 2,838,418 | 6/1958 | Starkweather | 117/65 |
| 3,002,854 | 10/1961 | Brill | 156/308 X |
| 3,080,266 | 3/1963 | Haslam | 156/308 X |
| 3,360,425 | 12/1967 | Boone | 156/329 X |
| 3,378,520 | 4/1968 | Sattlegger et al. | 260/46.5 |
| 3,772,122 | 11/1973 | Young | 156/329 |
| 3,907,848 | 9/1975 | Ferguson | 260/429.5 |
| 3,914,199 | 10/1975 | Lee et al. | 260/32.8 SB |
| 3,960,800 | 6/1976 | Kohl | 260/32.8 SB |
| 4,059,473 | 11/1977 | Okami | 156/308 |

FOREIGN PATENT DOCUMENTS

| | | | |
|---|---|---|---|
| 556942 | 5/1958 | Canada | 156/329 |
| 1072891 | 6/1967 | United Kingdom | 277/227 |

*Primary Examiner*—Robert S. Ward, Jr.
*Attorney, Agent, or Firm*—Wilson, Fraser, Barker & Clemens

[57] ABSTRACT

A gasket and a process for preparing it are disclosed in which the gasket comprises a base sheet and a sealant layer strongly adhered to it. The sealant layer comprises a polymerized, solid organopolysiloxane having an organotitanate dispersed therein. The organotitanate has a dual role. It retards the polymerization rate of the organopolysiloxane to provide a longer pot life which facilitates working with the polysiloxane. Also, the organotitanate acts as a coupling agent and greatly increases the adherence of the organopolysiloxane layer to the base sheet.

26 Claims, No Drawings

GASKET HAVING POLYSILOXANE SEALANT LAYER CONTAINING ORGANOTITANATE

BACKGROUND OF THE INVENTION

Gaskets are often used to provide a fluid type seal between two engaging, confronting or mating parts. A common example includes pipes or similar conduit having machined flanges which are butted together about a gasket, the gasket having a large central opening matching that of the interior of the pipes as well as much smaller peripheral holes registering with like holes in the flanges generally to receive bolts or the like, to secure the assembly together. Gaskets are used for many other like application, such as for cylinder heads of internal combustion engines, in valves, and the like.

In general, gaskets comprise a base sheet of uniformed thickness which may be sheet metal or of fibrous composition held together by a suitable bonding agent, and a deformable coat or bead which may cover all or only selected areas of the sheet. In use the coat or bead deforms or spreads under pressure of forcing together the parts between which the gasket material lies and aids in realizing the desired fluid-type seal between the parts.

Organopolysiloxanes, particularly those having elastomeric qualities, are known to have excellent properties such as thermal stability, dielectric properties, resistance to atmospheric deterioration, chemical inertness, non-toxicity, and retention of such properties even at elevated temperatures. Such properties uniquely adapt an organopolysiloxane as a sealant layer or coat on gasketing materials.

However, prior polysiloxane sealant layers have marginal adhesion to gasketing materials. As a result, delamination of the gasket occurs with attendant problems including entire loss of the gasketing function. When a fibrous base sheet is used in which the fibers are bonded to one another by a butadiene-acryonitrile elastomer, it has been noted that the problem of poor adhesion between the fibrous base sheet and an organopolysiloxane has been worsened. Further, while organopolysiloxanes have a useful pot life, it would be advantageous if the pot life could be lengthened. A longer pot life facilitates working with the organopolysiloxane in an unhurried manner and leads to more uniform results.

U.S. Pat. No. 2,512,058 to Gulledge relates to the modification of silicone type resins by the addition of a reactive compound of an amphoteric element. More particularly, a process is disclosed of reacting together as an anhydrous liquid mixture an ester of titanic acid and a hydrolysis product of an organohalosilane.

U.S. Pat. No. 2,716,656 to Boyd teaches a process for copolymerizing monomeric tetraorgano derivatives of orthotitanic acid with monomeric organosilicon derivatives. The preparation of the copolymers is carried out in an anhydrous solvent. The copolymerization reaction is dependent upon the amount of water added.

U.S. Pat. No. 2,751,314 to Keil relates to bonding silicone rubber to solid materials in which a titanium compound is applied to a solid surface and then a silicone rubber containing an alkyl polysilicate is applied.

U.S. Pat. No. 3,378,520 to Sattlegger et al concerns organopolysiloxane compositions convertible into elastomers. The patent describes an improvement in a composition of a hydroxy or alkoxy terminated linear organopolysiloxane and a carboxylic acid amido substituted silane or siloxane as cross-linking agent comprising the addition of a complex compound prepared from an alcoholate or phenolate of a number of metals including titanium with a diketone, a keto alcohol, a ketonic acid, or a ketonic acid alkyl ester.

SUMMARY OF THE INVENTION

An object of the invention is to provide a gasket having a sealant layer of an organopolysiloxane which has increased resistance to delamination. A related object is to provide a gasket having an organopolysiloxane seal which is tightly bonded to gasketing base sheet material by means of an organotitanate coupling agent. A further object is to provide a retardant for a polymerizable organopolysiloxane adapted to increase the pot life of the silicone resin.

In one form, the present gasket comprises a base sheet and a sealant layer strongly adhered to it. The sealant layer comprises a polymerized, solid organopolysiloxane having an organotitanate dispersed therein. The organotitanate serves to retard the rate of polymerization of the organopolysiloxane to the solid state and, as well, to couple the organopolysiloxane when solid to the base sheet and provide the strong adherence of the sealant layer.

Preferably, the polymerized organopolysiloxane is cross-linked and formed from a liquid organopolysiloxane having the formula:

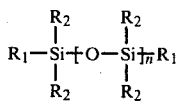

in which $R_1$ and $R_2$ are monovalent substituents which may be the same or different and are selected from hydrogen, methyl, ethyl, propyl, isopropyl, butyl, isobutyl, vinyl, phenyl, methyl phenyl, ethyl phenyl, propyl phenyl, isopropyl phenyl, butyl phenyl, isobutylphenyl, tolyl, and xylyl, provided that not more than about half of the $R_2$ substituents are hydrogen, and n is a number sufficiently low to provide the liquid state.

Desirably, the organopolysiloxane is a polyalkylphenylsiloxane, the alkyl group being preferably selected from methyl, ethyl, propyl, isopropyl, butyl, and isobutyl. Preferably, also, the organopolysiloxane contains at least 10 mole percent of the phenyl radical and is cross linked at least at some of its substituents. The preferred organopolysiloxane is polymethylphenylpolysiloxane in which the mole ratio of methyl to phenyl substituents varies from 1 to about 10.

The organotitanate may comprise from about 0.1% to about 4% by weight of the organopolysiloxane and preferably corresponds to the formula:

in which $R_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido of up to about 6 carbon atoms, benzyl, and hydrogen, provided that not all $R_3$'s are hydrogen.

A process for preparing the gasket includes admixing a liquid polymerizable organopolysiloxane and an organotitanate and then applying the mix to a base sheet. Heating the assembly polymerizes the organopolysiloxane to a solid state forming a sealant layer of the solid organopolysiloxane on the base sheet. The organotitanate retards the polymerization of the polysiloxane as well as increases its adherence as the sealant layer to the base sheet.

DESCRIPTION OF THE PREFERRED EMBODIMENTS

In general, the present gasket includes a base sheet having a strongly adherent sealant layer of a solid organopolysiloxane containing an effective amount of an organotitanate to retard the polymerization of the organopolysiloxane to the solid state and to effect such strong adherence of the sealant layer when solid to the base sheet.

Referring more particularly to the components of the gasket, the base sheet may comprise any one of a number of relatively dense sheet materials having a substantially uniform thickness which is deformable so as to conform to the contour of the surfaces over which the sheet is applied. Sheet materials which have been found useful include various fibrous compositions usually containing a fibrous reinforcing or bonding agent. Such fibers may include organic fibers, such as cellulose, or inorganic fibers, such as asbestos, as well as mixtures of the two. The fibrous network can be woven or bonded into an integral sheet by employing a suitable binding agent which can be naturally occurring resinous substances of various synthetic resins and elastomeric materials, such as natural or synthetic rubbers including polysulfide, acrylonitrile-butadiene, polychloroprene, and the like. Small proportions of metallic fibers can also be included in the base sheet. The base sheet may also comprise such structures as a semi-porous fiberboard reinforced with a thermosetting resin, such as a sheet of mineral fibers bonded with cured nitrile rubber or phenolic resin. In gaskets designed for high temperature applications, the base sheet preferably is a metal sheet such as a sheet of steel, aluminum, zinc, tin, copper, alloys of the same, and the like. Cold roller sheet steel is preferred as the metal sheet. Regardless of its composition, the base sheet may range in thickness from about 0.002 inch up to about 0.250 inch and preferably from about 0.005 inch to about 0.065 inch, although sizes outside of these ranges can be used. The base sheet may also comprise combinations of a metal sheet and a fibrous layer.

The organopolysiloxanes useful in the present invention include organopolysiloxanes in general but more desirably comprise polymers of lower alkyl or lower alkenyl siloxanes, phenyl siloxanes, lower alkyl or lower alkenyl substituted phenyl siloxanes, and mixtures thereof, the preparation of which is known in the art. For example, the polymers may include from about 15 to about 40 mole percent of alkyl siloxane units, from about 25 to about 55 percent phenyl siloxane units, and from about 30 to about 50 mole percent alkyl phenyl siloxane units. The silicon atoms of the various siloxane structural units are linked together by oxygen atoms in an alternating lattice of oxygen and silicon atoms. While a major portion of the oxygen atoms of the units are linked to two silicon atoms, a portion of the oxygen atoms are active centers for further polymerization and are present as residual hydroxyl, alkoxy or like radicals; note U.S. Pat. No. 2,605,194 to Smith, the disclosure of which is hereby incorporated by reference.

The polysiloxane may contain either linear, branched, or cyclic units, cured by condensation or addition polymerization, and are preferably cross-linked. For this purpose, cross-linking agents, known in the art may also be present. Such agents are usually unsaturated and may contain such unsaturated groups as vinyl groups. Their use leads to a three-dimensional network.

One class of organopolysiloxanes useful in the present process has the formula:

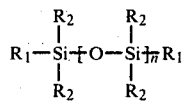

in which $R_1$ and $R_2$ are monovalent substituents which may be the same or different and are selected from hydrogen, methyl, ethyl, propyl, isopropyl, butyl, isobutyl, vinyl, allyl, phenyl, methyl phenyl, ethyl phenyl, propyl phenyl, isopropyl phenyl, butyl phenyl, isobutyl phenyl, tolyl, and zylyl, provided that not more than half of the $R_2$ substitutents are hydrogen, and n is a number sufficiently low to provide the liquid state. Except where $R_1$ or $R_2$ is hydrogen, the substituents are connected to silicon atoms by a carbon-silicon linkage. In one polymer useful in the invention, there was n alkyl to phenyl ratio of 1:1 per siloxane unit. As indicated, preferably a prepolymer is applied to the base sheet gasket material in a sufficiently low state of polymerization as to be in liquid form and then polymerized to a final solid state. This is preferably accomplished by heating the assembly, although polymerization can also be carried out by ionizing radiation. The preferred fluid prepolymers have a viscosity of about 100 centipoises to about 100,000,000 centipoises at 25° C. It will be appreciated that to obtain cross-linking during polymerization, the polymeric chain may have pendant silicon bonded olefinic siloxy units through which cross-linking may take place.

When the organosiloxane is in the solid state, n may vary from 10 to as much as 2500 or more, including the final polymerized state of the polysiloxane when it is cross-linked in a three dimensional network structure. Molecular weights of the cross-linked polysiloxane may vary, as an example, from about 250,000 to about 700,000.

The presence of the phenyl radical is important to both the flexibility and high temperature resistance of the present polysiloxane resins. As a rule, the polysiloxane resins should contain at least about 10 mole percent of the phenyl radical. In the preferred practice, the pendant $R_2$ substituents comprise about 50 mole percent alkyl and about 50 mole percent phenyl. The preferred alkyl substituent for $R_2$ is methyl.

Processes for preparing the present polysiloxanes are known in the art. In general, an alkyl chloride, such as methyl chloride, reacts under catalysis with silicon metal to form a family of organochlorosilanes. Hydrolysis of the organochlorosilanes can lead to the polysiloxanes. The polymerization embodies largely cross-linking of the polymeric chains as represented in Formula 1, although some chain extension can occur. As a rule, catalysts such as peroxides are incorporated with the polysiloxanes and upon exposure to heat generate free radicals which activate the alkyl ($R_2$) groups by hydrogen removal, such that the residue alkylene radicals define active sites for cross-linking. For example, two methyl groups of two different polymer chains may be so activated to form an ethylene cross-link. Where the $R_1$ substituents are unsaturated, as in vinyl, cross-linking can occur here as well due to the unsaturation of such groups. Or an unsaturated cross-linking agent can be present such as styrene.

It is this situs of the cross-linking activity away from the ends of the polymeric chains which leads to considerably more cross-linking than is the case when the polymeric chains cross-link only at their ends. The increased amount of cross-linking between the chains is, in turn, thought to result in tougher, more heat resistant polysiloxane resins.

The peroxide catalyst is used in an amount of about 0.05 percent to about 2 percent by weight of the resin and can comprise t-butyl perbenzoate which is stable in the polysiloxane compositions at room temperatures but rapidly decomposes at about 300° F. Other peroxide catalysts which can be used include benzoyl peroxide, phthalic peroxide, chlorobenzoyl peroxide, acetyl benzoyl peroxide, cyclohexyl hydroperoxide, diacetyl peroxide, and the like. However, cross-linking can be achieved by other than peroxide catalysis, such as by zinc metal which may be used in an amount of about 0.5 percent by weight based n the weight of the polysiloxanes. Metal salts of carboxylic acids, such as cobalt octoate, may be similarly used.

The gasket of the present invention should be flexible in order best to adapt it for a variety of mechanical applications and to increase its useful life. The use of the described polysiloxane resins alone suffices for most uses. In fact, flexibility of the polysiloxane coating can be varied by changing the mole ratio of the alkyl to phenyl $R_2$ substituents of Formula 1, such as from about 1 to about 10.

In any case, it will be understood that the organopolysiloxane which is to be polymerized or cured can, as a liquid, be a homopolymer, a copolymer, or a terpolymer, and can be either a single compound or a mixture of two or more different organopolysiloxanes.

In general organotitanates useful in the invention include salts of titanic acid in which the salt moiety is saturated or unsaturated, cyclic or acyclic, or aromatic. However, a desirable class of organotitanates has the formula:

$$Ti(OR_3)_4 \qquad (2)$$

in which $R_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido up to about 6 carbon atoms, benzyl, and hydrogen, provided that not all $R_3$'s are hydrogen.

In the preferred form, the organotitanate is a tetra-ester of orthotitanic acid, the term "tetraester" being taken to include tetra-amides, tetra-anhydrides, etc. The tetraesters of orthotitanic acid correspond to the Formula 2 except that $R_3$ is never hydrogen. Specific examples include tetraethyl titanate, tetrabutyl titanate, tetraisopropyl titanate, bis(acetylacetonyl)diisopropyl titanate, bis(acetylacetonyl)dimethyl titanate, bis(acetylacetonyl)-diethyl titanate, tetramethyl titanate, tetra(2-ethylhexyl) titanate, tetraacetylacetonyl titanate, tetraphenyl titanate, tetra(2-methoxyethoxy) titanate, diisopropyldiacetoxy titanate, tetraethylamido titanate, tetrapentylamido titanate, octylene glycol titanate, and mixtures thereof. Preferred organotitanates are tetrabutyl titanate and tetraacetylacetonyl titanate.

The esters of titanate acid hydrolyze quite readily in the presence of water, so that care should be exercised to maintain them in a relatively dry condition. The preparation of these titanates is known in the art and therefore is not described in detail. For example, tetraethyl titanate may be obtained through the reaction of sodium ethylate and titanium chloride; or through the reaction of the tetrachloride with anhydrous ethyl alcohol, using ammonia as a neutralizing agent. Other alkyl esters may also be made in this manner. Tetraphenyl titanate can be prepared from the reaction of phenol and titanium tetrachloride; or from the reaction of salicyclic acid and titanium tetrachloride. Octylene glycol titanate may be prepared as reacting octylene glycol with tetramethyl titanate in molar proportions of about 4 to 1.

In preparing a gasket of the present invention, the liquid organopolysiloxane and the organotitanate are admixed under substantially anhydrous conditions to form a reaction mix. The organotitanate may be used in solvent solution in which the solvent may be any suitable non-reactive organic solvent. Lower alkyl alcohols are preferred such as isopropylalcohol. Fairly large loadings are possible, for example 75% organotitanate and 25% solvent by weight.

The reaction mix accordingly comprises very little solvent and practically all polysiloxane and titanate. This also tends to insure substantially anhydrous conditions. In this respect, the present gasket has an advantage over those techniques of the prior art which use relatively large quantities of a solvent. The present application of the reaction mix results in a relatively heavy coat in one step due to the virtually solventless nature of the application. As a result, no solvent is apt to be entrapped in the cured coating.

Any amount of the organotitanate improves the organopolysiloxane in accordance with the present invention. As a rule, the organopolysiloxane comprises from about 0.1% to about 4% by weight of the organotitanate.

The reaction mix is applied to a base sheet of the gasket and reaction is then carried out. The manner of application is not critical and can be by roller coating, dipping, doctor knife, brushing, stenciling, silk-screening, and the like. The reaction mix may be applied to one or both sides of the base sheet and as a cover-all coating or in a selected continuous or discontinuous pattern. Thereafter, the base sheet and reaction mix are heated relatively slowly at first to drive off any small amount of solvent and other volatiles that may be present and then at higher temperatures for a time to complete the polymerization of the organopolysiloxane resin. As a rule, the heat-cure may take place at about 350° F. to about 600° F. for about 0.1 hour to about 2.5 hours. After application and polymerization of the organopolysiloxane to the solid state, the sealant layer formed may range in thickness from about 0.002 inch to about 0.015 inch, although these values are not critical and values outside this range can be used.

It has been found that the presence of the organotitanate retards the polymerization rate of the polymerizable organopolysiloxane, enabling it to be processed in a more unhurried manner. Even more significant, the organotitanate aids in adhering the organopolysiloxane to the base sheet, so that the resulting gasket has improved resistance to delamination. It is believed that the organotitanate serves as a coupling agent and that a chemical reaction can take place not only with the organopolysiloxane but also with the base sheet.

The following examples ony illustrate the invention and should not be construed to impose limitations on the claims.

EXAMPLES 1 THROUGH 3

A series of three different runs was carried out to prepare three different specimens of gaskets. The condition for preparation and the formulations were the same except that one formulation contained no organotitanate (Example 1), one formulation contained tetrabutyl titanate as the organotitanate (Example 2), and one formulation contained tetraacetylacetonyl titanate (Example 3). Table A lists the formulations:

TABLE A

| FORMULATIONS IN GRAMS | | | |
|---|---|---|---|
| Example | 1 | 2 | 3 |
| Organopolysiloxane | 100 | 100 | 100 |
| Chrome oxide pigment | 4 | 4 | 4 |
| X-Air Ruco | 0.1 | 0.1 | 0.1 |
| Tetrabutyl titanate | — | 0.5 | — |
| Tetraacetylacetonyl titanate | — | — | 0.5 |
| Curing agent | 10 | 10 | 10 |

The organopolysiloxane used was an organopolysiloxane which is available on the market under the trade designation, Dow Corning 96-083. This resin is a long chain dimethylpolysiloxane having a vinyl end-block. Its average molecular weight was determined to be 15,900 of which the vinyl groups constituted less than 2% by weight.

The chrome oxide pigment was not essential to the formulation and used merely to impart color. Similarly, the ingredients, X-Air Ruco, is a proprietary material believed to be an alkyl ether which aids in purging away gases to eliminate voids in the end product. It is not critical to the formulation or to the resulting product and is here disclosed only as part of the best mode of carrying out the invention. Still other agents can be used for this purpose. The curing agent was a silicone hydride purchased from Dow Corning under the trade designation "96-083 Curing Agent", but many other curing agents or catalysts can be used as is known in the art.

The titanate, where used, was dissolved in isopropyl alcohol and comprises 75% by weight of the alcohol. For Examples 2 and 3, the titanate was admixed with the liquid organopolysiloxane under substantially anhydrous conditions. For all examples, the formulations were roller coated on separate base sheets, each such sheet comprising an asbestos reinforced butadiene-acrylonitrile rubber gasketing material, to leave a coating of the reaction mix. The coated gasketing materials were cured in an oven for five minutes at 400° F. This formed a solid coating having a thickness of about 0.004 inch.

The presence of the organotitanate in Examples 2 and 3 was found to retard the polymerization rate of the organopolysiloxane to a solid state. The increase in pot life was from 30% to as much as 50%.

The resulting gaskets of Examples 1, 2 and 3 were subjected to several tests. One test was the ASTM D-816B, Type 1, Shear Adhesion Test. The gasket of Example 1 whose coating contained no organotitanate failed at 660 pounds per square inch, while the gasket of Example 2 which contained tetrabutyl titanate adhered well until 820 pounds per square inch was reached.

A peeling test was also carried out in which a circular portion of each gasket, measuring one inch in diameter and having a polysiloxane sealing layer of 4 mills, was pierced by a punch measuring 3/18 inch in diameter. The layer of the gasket of Example 1 peeled noticably. But in the layers of the gaskets of Examples 2 and 3 there was no peeling at all.

Although the foregoing describes several embodiments of the present, it is understood that the invention may be practiced in still other forms within the scope of the following claims.

I claim:

1. A gasket comprising a base sheet and a sealant layer strongly adhered thereto having increased resistance to delamination, said sealant layer comprising a polymerized, solid organopolysiloxane having an organotitanate dispersed substantially throughout said organopolysiloxane, said organotitanate serving to retard the rate of polymerization of said organopolysiloxane to said solid state to provide a longer pot life and to couple said organopolysiloxane to said base sheet and provide said strong adherence.

2. The gasket of claim 1 in which said base sheet is a metallic sheet.

3. The gasket of claim 1 in which said base sheet is a bonded fibrous layer.

4. The gasket of claim 1 in which said organopolysiloxane is polymerized from a liquid organopolysiloxane having the formula:

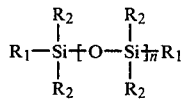

in which $R_1$ and $R_2$ are monovalent substituents which may be the same or different and are selected from hydrogen, methyl, ethyl, propyl, isopropyl, butyl, isobutyl, vinyl, allyl, phenyl, methyl phenyl, ethyl phenyl, propyl phenyl, isopropyl phenyl, butyl phenyl, isobutyl phenyl, tolyl, and xylyl, provided that not more than half of said $R_2$ substituents are hydrogen, and n is a number sufficiently low to provide the liquid state.

5. The gasket of claim 4 in which the $R_2$ substituents are methyl and phenyl, and the mole ratio of methyl to phenyl varies from about 1 to about 10.

6. The gasket of claim 1 in which said polymerized organopolysiloxane is a cross-linked elastomeric organopolysiloxane.

7. The gasket of claim 1 in which said polymerized organopolysiloxane is a polyalkylphenyl siloxane, said alkyl group being selected from methyl, ethyl, propyl, isopropyl, butyl, and isobutyl.

8. The gasket of claim 1 in which said polymerized organopolysiloxane contains at least 10 mole percent of the phenyl radical and is cross-linked at least at some of its substituents.

9. The gasket of claim 1 in which said polymerized organopolysiloxane is polymethylphenylsiloxane.

10. The gasket of claim 1 in which said polymerized organopolysiloxane contains from about 0.1% to about 4% by weight of said organotitanate.

11. The gasket of claim 1 in which said organotitanate corresponds to the formula:

Ti(OR$_3$)$_4$ in which R$_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido up to about 6 carbon atoms, benzyl, and hydrogen, provided that not all R$_3$'s are hydrogen.

12. The gasket of claim 1 in which said organotitanate is a tetraester of orthotitanic acid corresponding to the formula:

Ti(OR$_3$)$_4$ in which R$_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido of up to about 6 carbon atoms, and benzyl.

13. The gasket of claim 1 in which said organotitanate is tetrabutyl titanate.

14. The gasket of claim 1 in which said organotitanate is tetraacetylacetonyl.

15. A process for preparing a gasket having a sealant layer adapted to form a seal for fluids comprising applying a layer to a base sheet of a rection mix comprising a polymerizable organopolysiloxane and an adherent amount of an organotitanate, heating said layer to polymerize the organopolysiloxane to a solid form and adhere it to said base sheet, retarding the polymerization rate of said polymerizable organopolysiloxane by said organotitanate, and improving the adherence of said organopolysiloxane to said base sheet by said organotitanate.

16. The process of claim 15 in which said polymerizable organopolysiloxane has the formula:

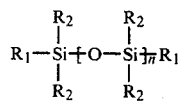

in which R$_1$ and R$_2$ are monovalent substituents which may be the same or different and are selected from hydrogen, methyl, ethyl, propy, isopropyl, butyl, isobutyl, vinyl, allyl, phenyl, methyl phenyl, ethyl phenyl, propyl phenyl, isopropyl phenyl, butyl phenyl, isobutyl phenyl, tolyl, and xylyl, provided that not more than about half of the R$_2$ substituents are hydrogen, and n is a number sufficiently low to provide the liquid state.

17. The process of claim 16 in which the R$_2$ substituents are methyl and phenyl, and the mole ratio of methyl to phneyl varies from 1 to about 10.

18. The process of claim 15 in which said polymerizable organopolysiloxane is a polyalkylphenyl siloxane, said alkyl group being selected from methyl, ethyl, propyl, isopropyl, butyl, and isobutyl.

19. The process of claim 15 in which said polymerizable organopolysiloxane contains at least 10 mole percent of the phenyl radical and is cross-linked at least at some of its substituents.

20. The process of claim 15 in which said polymerizable organopolysiloxane is polymethylphenylsiloxane.

21. The process of claim 15 in which said polymerizable organopolysiloxane contains from 0.1% to about 4% by weight of said organotitanate.

22. The process of claim 15 in which said organotitanate corresponds to the formula:

Ti(OR$_3$)$_4$ in which R$_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido of up to about 6 carbon atoms, benzyl, and hydrogen, provided that not all R$_3$'s are hydrogen.

23. The process of claim 15 in which said organotitanate is a tetraester of orthotitanic acid corresponding to the formula:

Ti(OR$_3$)$_4$ in which R$_3$ is a monovalent substituent which may be the same or different and is selected from alkyl and cycloalkyl from 1 to about 10 carbon atoms, alkenyl from 2 to about 4 carbon atoms, aliphatic acyl of 2 to about 8 carbon atoms, amido of up to about 6 carbon atoms, and benzyl.

24. The process of claim 15 in which said organotitanate is tetrabutyl titanate.

25. The process of claim 15 in which said organotitanate is tetraacetylacetonyl.

26. A gasket comprising a base sheet and a sealant layer strongly adhered to at least one face of the base sheet having increased resistance to delamination, said sealant layer comprising:

(a) a polymerized, cross-linked organopolysiloxane polymerized from a liquid organopolysiloxane having the formula:

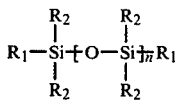

in which R$_1$ and R$_2$ are monovalent substituents which may be the same or different and are selected from hydrogen, methyl, ethyl, propyl, isopropyl, butyl, isobutyl, vinyl, allyl, phenyl, methyl phenyl, ethyl phenyl, propyl phenyl, isopropyl phenyl, butyl phenyl, isobutyl phenyl, tolyl, and xylyl, provided that not more than about half of the R$_2$ substituents are hydrogen, and n is a number sufficiently low to provide the liquid state and (b) from about 0.1% to about 4% by weight of the organopolysiloxane of an organotitanate adapted to retard the rate of polymerization of said organopolysiloxane to said solid state to provide a longer pot life, and to couple said polysiloxane to said base sheet and provide said strong adherence, said organotitanate corresponding to the formula:

Ti(OR$_3$)$_4$ in which R$_3$ is a monovalent substituent which may be the same or different and is selected from alkyl and cycloalkyl from one to about 10 carbon atoms, alkenyl from two to about four carbon atoms, aliphatic acyl of two to about eight carbon atoms, amido up to about six carbon atoms, benzyl, and hydrogen, provided that not all R$_3$'s are hydrogen.

* * * * *